US009787667B2

(12) United States Patent
Kostiainen (10) Patent No.: US 9,787,667 B2
(45) Date of Patent: Oct. 10, 2017

(54) ATTESTED SENSOR DATA REPORTING (71) Applicant: Nokia Technologies Oy, Espoo (FI)

(72) Inventor: Kari Kostiainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/435,415

(22) PCT Filed: Oct. 16, 2012

(86) PCT No.: PCT/FI2012/050990
§ 371 (c)(1),
(2) Date: Apr. 13, 2015

(87) PCT Pub. No.: WO2014/060633
PCT Pub. Date: Apr. 24, 2014

(65) Prior Publication Data
US 2015/0281219 A1 Oct. 1, 2015

(51) Int. Cl.
*H04L 9/00* (2006.01)
*H04L 29/06* (2006.01)
*H04L 9/32* (2006.01)
*G06F 21/57* (2013.01)

(52) U.S. Cl.
CPC .......... *H04L 63/0823* (2013.01); *G06F 21/57* (2013.01); *H04L 9/3234* (2013.01); *H04L 9/3247* (2013.01); *H04L 9/3271* (2013.01); *H04L 63/0876* (2013.01); *H04L 2209/805* (2013.01)

(58) Field of Classification Search
CPC ............... H04L 63/0823; H04L 9/3234; H04L 9/3247; H04L 9/3271; H04L 63/0876; H04L 2209/805
See application file for complete search history.

(56) References Cited

U.S. PATENT DOCUMENTS

| 5,659,617 | A | * | 8/1997 | Fischer | H04L 9/3271 380/258 |
| 6,269,446 | B1 | | 7/2001 | Scjumacher et al. | |
| 7,203,967 | B2 | * | 4/2007 | Chmaytelli | G06F 21/10 380/202 |
| 8,499,161 | B2 | * | 7/2013 | Cha | G06F 21/725 713/178 |
| 8,630,620 | B2 | * | 1/2014 | Cha | H04L 63/04 380/247 |
| 8,806,565 | B2 | * | 8/2014 | Aura | H04L 63/0823 713/156 |
| 8,837,733 | B2 | * | 9/2014 | Alpert | H04L 9/0816 380/270 |

(Continued)

FOREIGN PATENT DOCUMENTS

| CN | 102016865 A | 4/2011 |
| WO | 2011/101795 A1 | 8/2011 |

OTHER PUBLICATIONS

Computer Desktop Encyclopedia Definition of processor, 2013.*
(Continued)

*Primary Examiner* — Sharon Lynch
(74) *Attorney, Agent, or Firm* — Harrington & Smith (57) ABSTRACT A apparatus and a method for attested sensor data reporting, wherein a challenge is received from an online service; sensor data is read; and a sensor data signature based on the sensor data is created and sent to the online service.

13 Claims, 6 Drawing Sheets

(56) References Cited

U.S. PATENT DOCUMENTS

| | | | | |
|---|---|---|---|---|
| 9,160,536 | B2* | 10/2015 | Joyce, III | H04L 9/3231 |
| 2005/0251857 | A1* | 11/2005 | Schunter | G06F 21/57 726/16 |
| 2007/0266256 | A1* | 11/2007 | Shah | G06F 21/725 713/178 |
| 2008/0098469 | A1* | 4/2008 | Morijiri | H04L 9/3271 726/5 |
| 2008/0182592 | A1* | 7/2008 | Cha | H04L 63/04 455/456.3 |
| 2008/0209515 | A1* | 8/2008 | Ibrahim | G06F 21/6218 726/3 |
| 2008/0320308 | A1 | 12/2008 | Kostiainen et al. | |
| 2009/0254753 | A1* | 10/2009 | De Atley | G06F 21/51 713/176 |
| 2009/0257589 | A1* | 10/2009 | Yokota | H04N 7/18 380/216 |
| 2010/0011214 | A1* | 1/2010 | Cha | G06F 21/725 713/175 |
| 2010/0292556 | A1* | 11/2010 | Golden | A61B 5/7465 600/364 |
| 2011/0010543 | A1* | 1/2011 | Schmidt | H04W 12/10 713/168 |
| 2011/0225626 | A1* | 9/2011 | Covington | G06F 21/57 726/1 |
| 2011/0320823 | A1* | 12/2011 | Saroiu | G06F 21/53 713/189 |
| 2012/0105199 | A1* | 5/2012 | Sanders | H04L 67/306 340/5.81 |
| 2012/0105201 | A1* | 5/2012 | Sanders | G05B 15/02 340/5.83 |
| 2012/0159172 | A1 | 6/2012 | Saxena | |
| 2012/0246470 | A1* | 9/2012 | Nicolson | G06F 21/57 713/158 |
| 2012/0324214 | A1* | 12/2012 | Asokan | G06F 21/57 713/100 |
| 2013/0117572 | A1* | 5/2013 | Berczes | H04L 9/3247 713/178 |
| 2013/0138964 | A1* | 5/2013 | Joyce, III | H04L 9/3231 713/176 |
| 2013/0198797 | A1* | 8/2013 | Raghuram | G06F 21/57 726/1 |
| 2013/0243189 | A1* | 9/2013 | Ekberg | H04L 9/3297 380/44 |
| 2013/0312125 | A1* | 11/2013 | Schmidt | G06F 21/725 726/36 |
| 2014/0075496 | A1* | 3/2014 | Prakash | G06F 21/6218 726/1 |
| 2014/0109191 | A1* | 4/2014 | Raghuram | H04L 67/1097 726/4 |
| 2014/0156531 | A1* | 6/2014 | Poon | G06Q 20/4016 705/44 |
| 2015/0237502 | A1* | 8/2015 | Schmidt | H04W 12/10 726/7 |
| 2016/0134636 | A1* | 5/2016 | Raghuram | G06F 21/57 726/4 |

OTHER PUBLICATIONS

STIC Search Report for U.S. Appl. No. 14/435,415 (Requested and Received Jun. 16, 2017).*

Kari Kostiainen et al, Practical Property-Based Attestation on Mobile Devices in, International Conference on Trust and Trusted Computing 78-92 (Springer, 2011).*

International Search Report and Written Opinion received for corresponding Patent Cooperation Treaty Application No. PCT/FI2012/050990, dated Jun. 20, 2013, 11 pages.

"Foursquare", Foursquare, Retrieved on May 31, 2016, Webpage available at : https://foursquare.com/about.

"Get Directions and Show Routes", Google Maps Help, Retrieved on May 31, 2016, Webpage available at : http://support.google.com/maps/bin/answer.py?hl=en&answer=2549020&topic=1687356&ctx=topic.

Gilbert et al., "YouProve: authenticity and fidelity in mobile sensing", Proceedings of the 9th ACM Conference on Embedded Networked Sensor Systems, Nov. 1-4, 2011, pp. 176-189.

Saroiu et al., "I Am a Sensor, and I Approve This Message", Proceedings of the Eleventh Workshop on Mobile Computing Systems & Applications, Feb. 22-23, 2010, 6 pages.

Gilbert et al., "Toward Trustworthy Mobile Sensing", Proceedings of the Eleventh Workshop on Mobile Computing Systems & Applications, 2010, pp. 31-36.

Saroiu et al., "Enabling New Mobile Applications With Location Proofs", Proceedings of the 10th workshop on Mobile Computing Systems and Applications, Feb. 23-24, 2009.

Dua et al., "Towards Trustworthy Participatory Sensing", Proceedings of the 4th USENIX conference on Hot topics in security, 2009, pp. 1-6.

Reddy et al., "MobiSense—Mobile Network Services for Coordinated Participatory Sensing", International Symposium on Autonomous Decentralized Systems, Mar. 23-25, 2009, pp. 1-6.

"TPM Main Specification", Trusted computing group, Level 2, Version 1.2, Revision 116, Mar. 1, 2011, 724 pages.

"ARM TrustZone", The Architecture for the Digital World, Retrieved on May 31, 2016, Webpage available at : http://www.arm.com/products/processors/technologies/trustzone/index.php.

Kostiainen et al., "Practical Property-Based Attestation on Mobile Devices", Trust and Trustworthy Computing, vol. 6740, 2011, pp. 78-92.

"Car Connectivity Consortium", Mirror Link, Retrieved on May 31, 2016, Webpage available at : http://www.terminalmode.org/.

Extended European Search Report received for corresponding European Patent Application No. 12886813.0, dated May 11, 2016, 7 pages.

Winkler et al., "User-Based Attestation for Trustworthy Visual Sensor Networks", IEEE International Conference on Sensor Networks, Ubiquitous, and Trustworthy Computing (SUTC), 2010, pp. 74-81.

* cited by examiner

ATTESTED SENSOR DATA REPORTING

RELATED APPLICATION

This application was originally filed as PCT Application No PCT/FI2012/050990 filed Oct. 16, 2012.

TECHNICAL FIELD

The present application generally relates to attested sensor data reporting.

BACKGROUND

Online services and their client applications that utilize sensor readings are becoming increasingly popular in mobile devices, such as smartphones or tablets. For example services such as social media services allow a user of a mobile device utilize e.g. sensor data on the location of the device to report her location to an online service for different purposes.

Sensor data provided by a mobile device to an online service is prone to manipulation, even with malicious intent. Platforms used in mobile devices are open and applications can be developed with the intent of providing manipulated sensor data, e.g. false location data.

Accordingly, it is important for online services to be able to attest, i.e. to ascertain, the validity of provided sensor data.

SUMMARY

According to a first example aspect of the invention, there is provided an apparatus comprising:
a memory;
a sensor; and
a first processor configured to cause the apparatus to:
 receive a challenge from an online service;
 read sensor data;
 create a sensor data signature based on the sensor data; and
 send the sensor data signature, the challenge and the sensor data to the online service.

The first processor may further be configured to cause the apparatus
prior to creating the sensor data signature to determine an application identifier; and wherein
sending the sensor data signature, the challenge and the sensor data to the online service further comprises sending the application identifier and a device certificate to the online service.

The first processor may be configured to cause the application to receive the challenge.

The first processor may be configured to cause the application to read the sensor data.

The first processor may be configured to cause an attestation component to determine the application identifier of the application.

The first processor may be configured to cause a trusted zone to create the sensor data signature.

The first processor may be configured to cause the trusted zone to create the sensor data signature from the challenge, the sensor data and the application identifier.

The first processor may be configured to cause the trusted zone to send the sensor data signature, the challenge, the sensor data, the application identifier and a device certificate to the online service.

The first processor may further be configured to cause the apparatus prior to receiving the challenge to:
receive a nonce from the online service;
select a property;
check an identity of an application;
create a property signature based on the property; and
send the property signature, the nonce, the selected property, a device certificate and a public key to the online service.

The first processor may be configured to cause the application to select the property.

The first processor may be configured to cause an attestation component to check the identity of the application.

The first processor may be configured to cause a trusted zone to create the property signature.

The first processor may be configured to cause the trusted zone to create the property signature from the property, the nonce and the public key.

The first processor may be configured to cause the trusted zone to send the property signature, the nonce, the selected property, a device certificate and a public key to the online service.

The first processor may be configured to cause the application to create the sensor data signature from the challenge and the sensor data.

The first processor may be configured to cause the application to send the sensor data signature, the challenge and the sensor data to the online service.

According to a second example aspect of the invention there is provided a method comprising:
receiving a challenge from an online service;
reading sensor data;
creating a sensor data signature based on the sensor data; and
sending the sensor data signature, the challenge and the sensor data to the online service.

The method may further comprise
prior to creating the sensor data signature determining an application identifier; wherein
sending the sensor data signature, the challenge and the sensor data to the online service may further comprise sending the application identifier and a device certificate to the online service.

The application may receive the challenge.
The application may read the sensor data.
An attestation component may determine the application identifier of the application.
A trusted zone may create the sensor data signature.
The trusted zone may create the sensor data signature from the challenge, the sensor data and the application identifier.
The trusted zone may send the sensor data signature, the challenge, the sensor data, the application identifier and a device certificate to the online service.

The method may further comprise prior to receiving the challenge:
receiving a nonce from the online service;
selecting a property;
checking an identity of an application;
creating a property signature based on the property; and
sending the property signature, the nonce, the selected property, a device certificate and a public key to the online service.

The application may receive the nonce.
The application may select the property.
An attestation component may check the identity of the application.

A trusted zone may create the property signature.

The trusted zone may create the property signature from the property, the nonce and the public key.

The trusted zone may send the property signature, the nonce, the selected property, a device certificate and a public key to the online service.

The application may create the sensor data signature from the challenge and the sensor data.

The application may send the sensor data signature, the challenge and the sensor data to the online service.

According to a third example aspect of the invention there is provided an apparatus comprising:
 a second processor configured to cause the apparatus to:
  create and send a challenge to a mobile device;
  receive a sensor data signature, the challenge and sensor data from the mobile device;
  verify the sensor data signature; and
  check the challenge.

Receiving the sensor data signature, the challenge and the sensor data from the mobile device may further comprise receiving an application identifier and a device certificate from the mobile device; and the second processor may further be configured to cause the apparatus to verify the trustworthiness of the application identifier.

The second processor may be configured to cause the apparatus to verify the sensor data signature based on the device certificate.

The second processor may further be configured to cause the apparatus prior to creating and sending the challenge to:
 create and send a nonce to the mobile device;
 receive a property signature, the nonce, a selected property, a device certificate and a public key from the mobile device;
 verify the property signature; and
 check the property.

The second processor may be configured to cause the apparatus to verify the property signature based on the device certificate.

The second processor may be configured to cause the apparatus to verify the sensor data signature based on the public key.

According to a fourth example aspect of the invention, there is provided a method comprising:
 creating and sending a challenge to a mobile device;
 receiving a sensor data signature, the challenge and sensor data from the mobile device;
 verifying the sensor data signature; and
 checking the challenge.

Receiving the sensor data signature, the challenge and the sensor data from the mobile device may further comprise receiving an application identifier and a device certificate from the mobile device; and the method may further comprise verifying the trustworthiness of the application identifier.

The sensor data signature may be verified based on the device certificate.

The method may further comprise prior to creating and sending the challenge:
 creating and sending a nonce to the mobile device;
 receiving a property signature, the nonce, a selected property, a device certificate and a public key from the mobile device;
 verifying the property signature; and
 checking the property.

The property signature may be verified based on the device certificate.

The sensor data signature may be verified based on the public key.

According to a fifth example aspect of the invention, there is provided a computer program, comprising:
 code for performing a method of any example aspect of the invention,
 when the computer program is run on a processor.

According to an sixth example aspect of the invention, there is provided a memory medium comprising the computer program of the fifth example aspect.

According to a seventh example aspect of the invention, there is provided a system comprising the apparatus of the first example aspect of the invention and the apparatus of the third example aspect of the invention.

Any memory medium hereinafter or hereinbefore may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory, polymer memory or any combination thereof. The memory medium may be formed into a device without other substantial functions than storing memory or it may be formed as part of a device with other functions, including but not limited to a memory of a computer, a chip set, and a sub assembly of an electronic device.

Different non-binding example aspects and example embodiments of the present invention have been illustrated in the foregoing. The foregoing example embodiments are used merely to explain selected aspects or steps that may be utilized in implementations of the present invention. Some example embodiments may be presented only with reference to certain example aspects of the invention. It should be appreciated that corresponding example embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 8 of the drawings.

Figure 1:
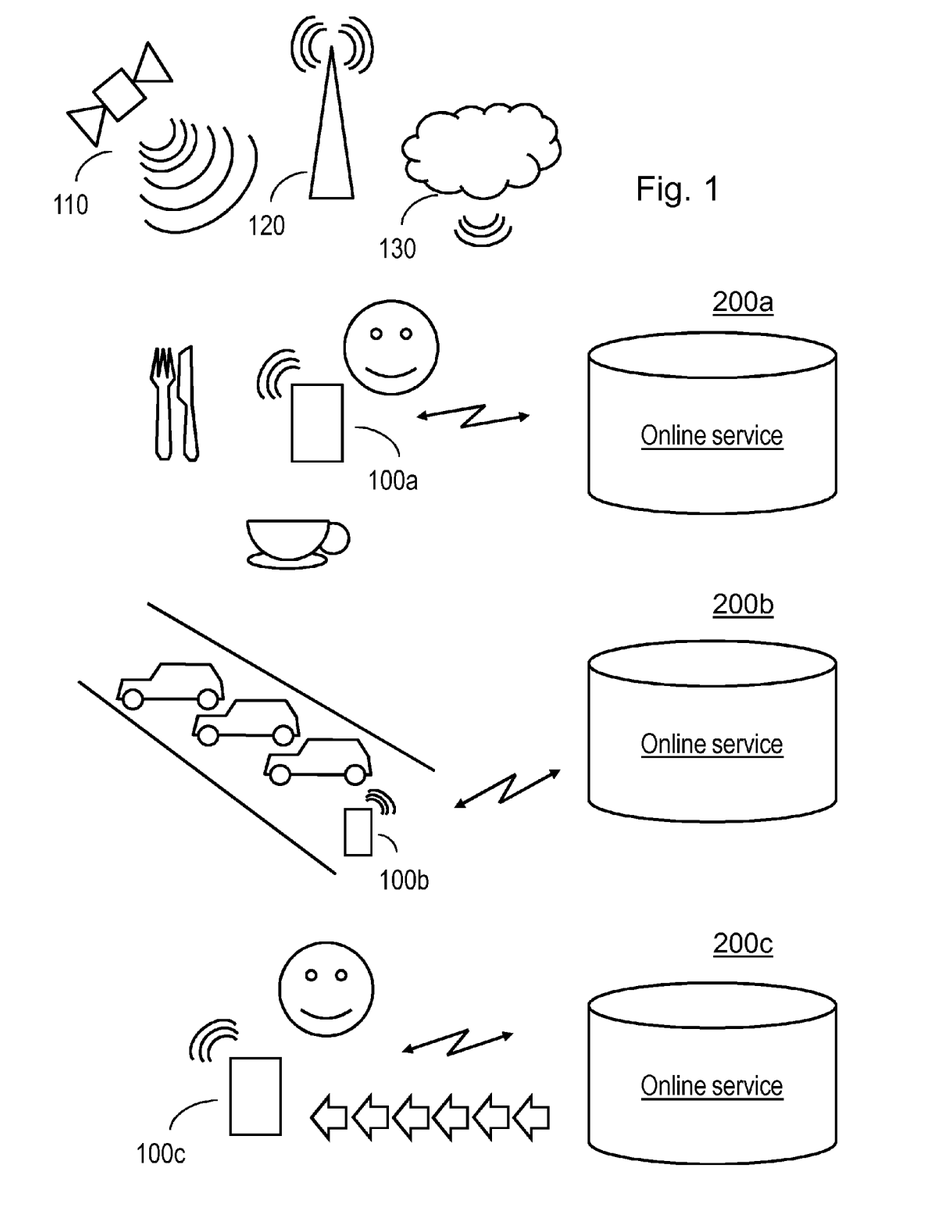
FIG. 1 shows an example environment of attested sensor data reporting according to an example embodiment.

FIG. 1 shows an example environment of attested sensor data reporting according to an example embodiment. The users of mobile devices 100a-100c engage in different activities and use online services 200a-200c. The mobile devices 100a-100c provide sensor data to the online services 200a-200c, typically the sensor data comprises data on the location, or position, of the mobile devices 100a-100c and the user thereof. The mobile devices 100a-100c comprise applications, or client applications, allowing the mobile devices to connect to the online service 200a-200c. In an example embodiment, the sensor data, i.e. the location data, is obtained using a positioning service based on satellite positioning, e.g. global positioning system (GPS) utilizing satellites 110 of which one is shown. In a further example embodiment, the location data is obtained using a positioning service utilizing a telecommunications network 120, such as a 3g-network or using a positioning system utilizing further telecommunications networks 130 such as wireless local area networks (WLAN) or bluetooth networks. The skilled person appreciates that in a further example embodiment, other types of sensor data is provided to the online service in addition to or instead of location data.

It is of interest to the online service 200, and the providers thereof, as well as for the users of the mobile service, i.e. the users of the apparatus 100a-c that the location data provided for the online service 200a-c by the apparatus 100a-c is correct, actual and corresponds to the real location of the apparatus. Furthermore, the correctness of the data is of interest to third parties, such as firms providing further services to their customers, e.g. users of the apparatus 100a-c or advertisers targeting those users, through the online service 200a-c. Hence, in accordance with example embodiments of the invention attested sensor data is reported to the online service 200, i.e. the sensor data is attested or ascertained as described hereinafter.

Figure 2:
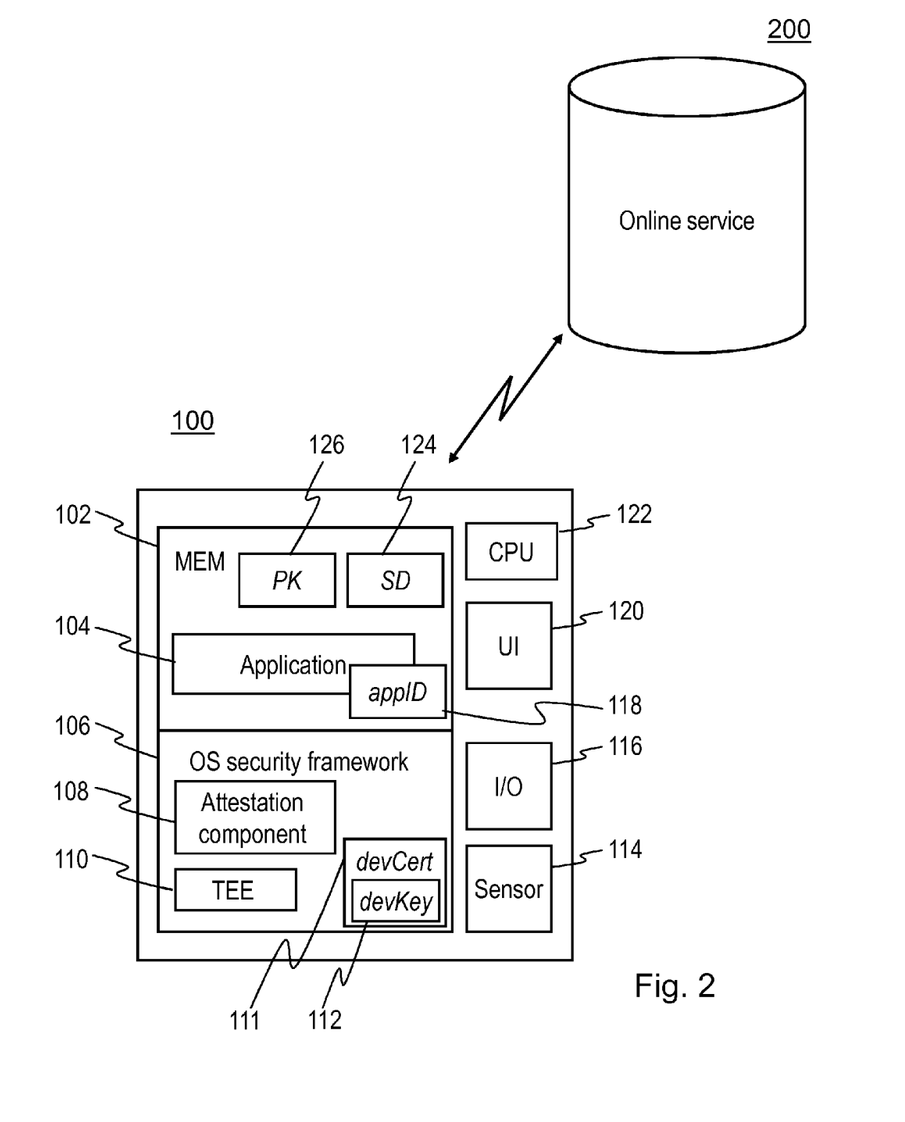
FIG. 2 shows an architectural overview of a system of an example embodiment.

FIG. 2 illustrates an architectural overview of a system suited for performing some example embodiments. The system comprises an apparatus 100, or mobile device or user device. The apparatus 100 is, for example, a portable device such as a mobile phone, a smartphone, a portable gaming device, a navigator, a personal digital assistant, a tablet computer, laptop computer, or a portable web browser. The device 100 generally has capabilities for processing information, for performing cryptographic operations and for communicating with other entities, such as the online service 200 at least intermittently when in contactless or contacting access therewith, or with a related communication element.

The apparatus 100, which is capable of functioning as a mobile device, has a processing circuitry, e.g. for cryptographic operations, such as a processor 122, hereinafter referred to as the first processor. The apparatus 100 has an operating system (OS) security framework 106, comprising an attestation component 108 for attesting, or ascertaining or securing, sensor data. The OS security framework comprises a secure environment processing circuitry such as an isolated Trusted Execution Environment (TEE) 110 and a device specific signing key devKey 112 certified with a device specific certificate devCert 111 by a trusted authority, e.g. the manufacturer of the apparatus 100.

The apparatus 100 further comprises a communication interface 116, i.e. an input/output (I/O)-interface and a memory 102 coupled to the first processor 122. It shall be understood that any coupling in this document refers to functional or operational coupling; there may be intervening components or circuitries in between coupled elements unless expressly otherwise described.

The memory 102 comprises a work memory and a non-volatile memory such as a read-only memory, flash memory, optical or magnetic memory or any combination thereof. In the memory 102, typically at least initially in the non-volatile memory, there is stored software such as applications 104 operable to be loaded into and executed by the first processor 122. The software, or the application 104, comprises in an example embodiment, one or more software modules and can be in the form of a computer program product that is software stored in a memory medium. Furthermore, in an example embodiment, the memory 102 comprises stored therein sensor data SD 124 and a public part of the application specific key pair, or public key, PK 126. In a further example embodiment, the application 104 comprises an application identifier appID 118 assigned to the application by a trusted application infrastructure, such as an official application store of a service provider or manufacturer of the device 100.

The I/O interface 116 is configured to provide local communications over one or more local links. The links may be wired and/or wireless links. The I/O interface 116 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The I/O interface 116 may be integrated into the apparatus 100 or into e.g. an adapter, card or that may be inserted into a suitable slot or port of the apparatus 100. While FIG. 2 shows one I/O interface 116, the apparatus may comprise a plurality thereof.

The first processor 122 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 122, but the apparatus 100 may comprise a plurality thereof.

As mentioned in the foregoing, the memory 102 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, or a smart card or any combination thereof. In some example embodiments, only volatile or non-volatile memory is present in the apparatus 100. Moreover, in some example embodiments, the apparatus comprises a plurality of memories. In some example embodiments, various elements are integrated. For instance, the memory 102 can be constructed as a part of the apparatus 100 or e.g. inserted into a slot or port. Further still, the memory 102 may serve the sole purpose of storing data, or it may be constructed as a part of an apparatus serving other purposes, such as processing data. Similar options are thinkable also for various other elements.

The apparatus 100 further has a user interface (UI) 120 and a sensor 114. The apparatus 100 has access to sensor data SD 124 obtained by sensor or sensors 114 integrated therewith or to sensor data obtained from an external source, in an example embodiment through the I/O interface 116 and/or through the sensor 114 and/or through the application 104. A skilled person appreciates that in some example embodiments, the sensor 114 is any functional unit or element that has access to sensor or measurement data either directly or indirectly, e.g. through an external source. Furthermore, in some example embodiments, the sensor data SD comprises any data, for example stored in the memory 102, that is to be attested according to an example embodiment.

A skilled person appreciates that in addition to the elements shown in FIG. 2, the apparatus 100 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry or ciphering/deciphering circuitry. Additionally, the apparatus 100 may comprise a disposable or rechargeable battery (not shown) for powering the apparatus if external power supply is not available.

A skilled person appreciates that the online service 200 is depicted schematically in FIG. 2 and comprises units or parts that are not shown. In an example embodiment the online service is implemented as a server or a cluster of servers or as a cloud server. In a further example embodiment the online service 200 is a web-based service or a service implemented on web-based platform. In an example embodiment, the online service comprises one or several services which the apparatus 100 is able to access through an application, or client application 104. In an example embodiment, the online service 200 stores user data, such as identification of mobile devices, client application identities, user identities or usernames.

Furthermore, the online service comprises or is coupled to a processor (not shown), hereinafter referred to as second processor, for controlling and/or executing operations, such as cryptographic operations, of the online service 200. The second processor is, for instance, a central processing unit (CPU), a microprocessor, a digital signal processor (DSP), a graphics processing unit, an application specific integrated circuit (ASIC), a field programmable gate array, a microcontroller or a combination of such elements.

Although not shown, the online service 200 comprises or is functionally coupled to a communications interface suited for establishing communication links with other services or apparatuses or for data transfer, e.g. using the Internet. Such telecommunication links may be links using any of: wireless local area network links, Bluetooth, ultra-wideband, cellular or satellite communication links. In a further example embodiment, the online service comprises or is coupled to physical or virtual units, for example further processors, software engines or applications, providing functionality for controlling various operations, such as cryptographic operations, of the online service 200. Furthermore, the online service 200 comprises or is coupled to a memory that comprises various data needed for the operations thereof, including e.g. public key(s) and user data. The skilled person appreciates that in some example embodiments, the online service 200 comprises other elements, such as user interface device, display or audio devices.

Figure 3:
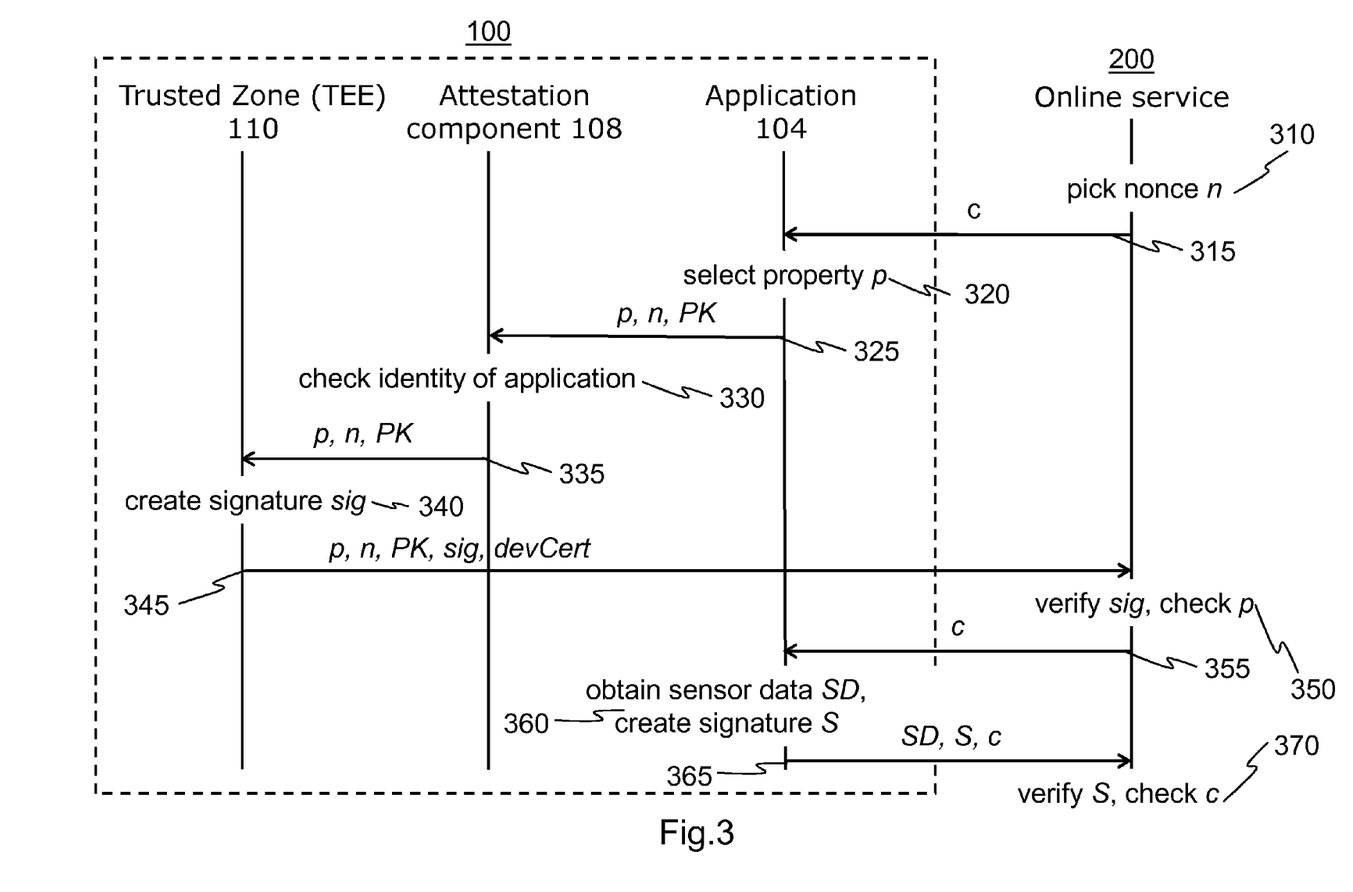
FIG. 3 shows a messaging architecture according to an example embodiment.

FIG. 3 shows a messaging architecture according to an example embodiment. A skilled person appreciates that the first processor 122 and/or the second processor is configured to cause the performing of the operations shown. The online service 200, wishing to receive attested sensor data from an apparatus, or mobile device, 100 picks 310 a nonce n. In an example embodiment, the nonce n is picked or created at random in order to ascertain the freshness of the application attestation. The picked random nonce n is saved for later verification and sent 315 to the application 104, which is to be attested. In an example embodiment, the application is first attested and therethrough the sensor data to be received later.

The application 104 selects 320 a property p to be attested. In an example embodiment the application 104 wishes to attest the property p of being a trustworthy client application of the online service 200. In an example embodiment, the application 104 chooses the property p to be attested from several possibilities. The application 104 then makes a call 325 to the attestation component 108 of the apparatus 100. In an example embodiment, the parameters of the call 325 are the random nonce n, the property p to be attested and the public part of an application specific public key PK.

The attestation component 108 checks 330 the identity of the application 104. In an example embodiment, the identity is provided by the underlying operating system platform security framework 106, which is a part of the trusted operating system the integrity of which can be guaranteed. In an example embodiment, the attestation component 108 checks e.g. from a predefined translation table that the identity of the application 104 matches the property p to be attested. If the identity of the application 104 matches the property p to be attested, the attestation component sends 335 the random nonce n, the property p to be attested and the public key PK, or a hash thereof, to the trusted zone (TEE) 110 to be signed. A property signature sig is created 340 from the random nonce n, the property p to be attested and the public key PK, or a hash thereof, using a device specific signing key devKey 112 certified with device specific certificate devCert 111 by a trusted authority.

The resulting property signature sig is sent 345 to the online service 200 together with the random challenge c, the property p, the public key PK and the device specific certificate devCert. The online service 200 checks 350 the property signature sig using the device certificate devCert. At this point the online service 200 knows that the application 104 matching the property p and having a key pair with the public key PK is present in the apparatus 100, for example the online service 200 knows that a trustworthy client application 104 thereof is present.

After the application 104 has been thus attested, attestation of sensor data SD is subsequently performed. In an example embodiment, several sensor data attestations can be performed after a successful attestation of the application 104. The online service 200 picks a random challenge c and sends 355 it to the application 104. The application 104 obtains or reads sensor data SD from the sensor 114 or from the memory 102 and creates 360 a sensor data signature S from the sensor data SD and the random challenge c using the private part of an application specific key pair.

The sensor data signature S, the sensor data SD and the random challenge c are then sent 365 to the online service 200. The online service 200 attests the sensor data SD by verifying the sensor data signature S using the public key PK that was received 345 with the attestation of the application 104. The online service 200 further ascertains that the sensor data is actual using the challenge c in order to verify that the application 104 or a malicious third party is not providing outdated sensor data SD that had been previously signed.

Figure 4:
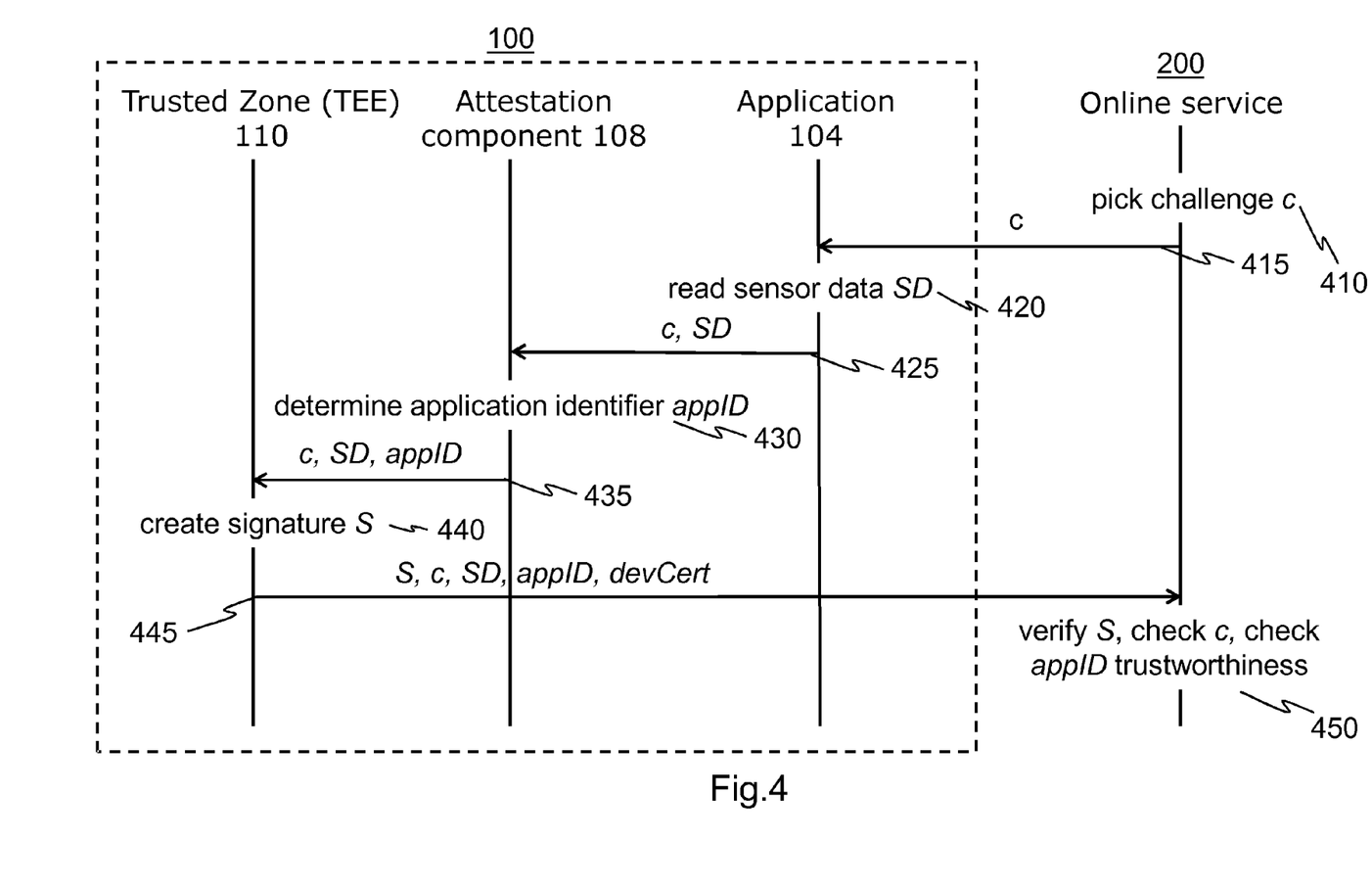
FIG. 4 shows a messaging architecture according to an example embodiment.

FIG. 4 shows a messaging architecture according to a further example embodiment. A skilled person appreciates that the first processor 122 and/or the second processor is configured to cause the performing of the operations shown. The online service 200, wishing to receive attested sensor data from an apparatus, or mobile device, 100 picks 410 a challenge c. In an example embodiment, the challenge c is picked or created at random in order to ascertain the freshness of the sensor data attestation. The picked random challenge c is saved for later verification and sent 415 to the application 104, the sensor data SD from which is to be attested.

The application 104 obtains or reads 420 the sensor data SD to be attested from the sensor 114 or from the memory 102. The application 104 then makes a call 325 to the attestation component 108 of the apparatus 100. In an example embodiment, the parameters of the call 425 are the random challenge c and the sensor data SD to be attested. The trusted attestation component 108 determines the application identifier appID 118, assigned by a trusted application certification infrastructure, of the calling application 104.

The attestation component then sends 435 the random challenge c, the sensor data SD to be attested and the application identifier appID to the trusted zone (TEE) 110 to be signed. A sensor data signature S is created 440 from the random challenge c, the sensor data SD to be attested and the application identifier appID using a device specific signing key devKey 112 certified with device specific certificate devCert 111 by a trusted authority.

The sensor data signature S, the sensor data SD, the challenge c, the application identifier appID and the device certificate devCert are then sent 445 to the online service 200. The online service 200 verifies 450 the sensor data signature S using the device certificate devCert that was received with the sensor data signature S and further ascertains that the sensor data attestation is actual using the challenge c in order to verify that the application 104 or a malicious third party is not providing outdated sensor data SD that had been previously signed. The online service finally attests the sensor data SD by checking the trustworthiness of the received and signed application identifier appID.

Figure 5:
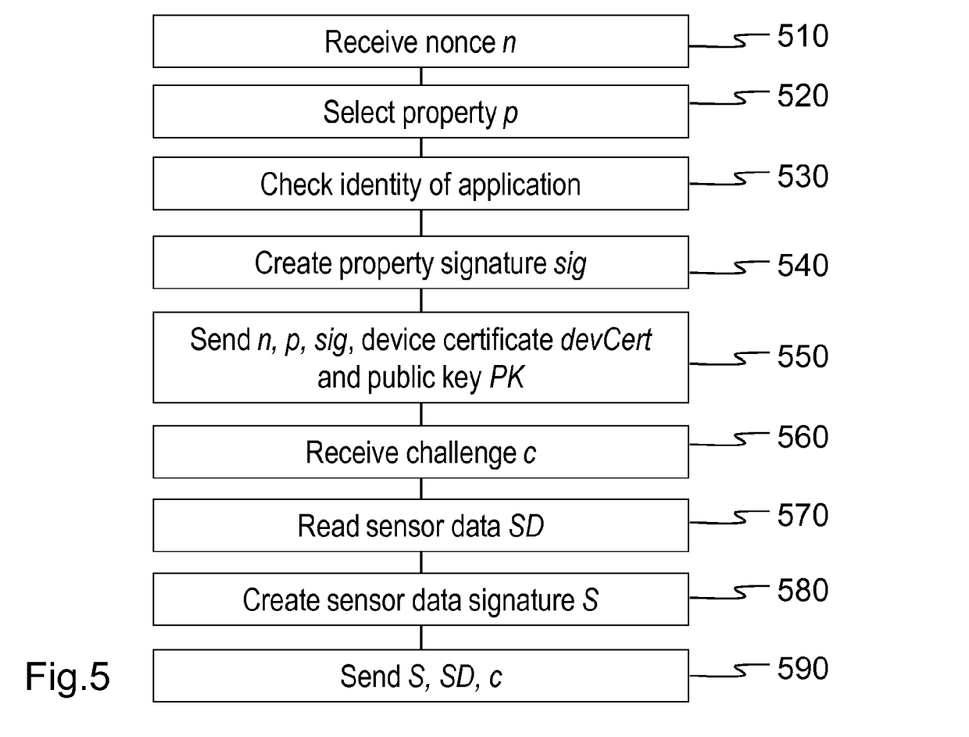
FIG. 5 shows a flow diagram of a method according to an example embodiment in a mobile device.

FIG. 5 shows a flow diagram of the method in the apparatus 100, or mobile device, according to an example embodiment. The steps of the method are carried out as described hereinbefore with reference to FIG. 3.

| | |
|---|---|
| 510 | The application 104 receives a random nonce c. |
| 520 | The application 104 selects the property p to be attested. |
| 530 | The attestation component 108 checks that the identity of the application matches the property p. |
| 540 | The trusted zone (TEE) 110 creates a property signature sig. |
| 550 | The property signature sig, the random nonce n, the property p, the public key PK and the device specific certificate devCert are sent |
| 560 | The application 104 receives a random challenge c. |
| 570 | The application 104 obtains sensor data SD. |
| 580 | The application 104 creates a sensor data signature S. |
| 590 | The sensor data signature S, the sensor data SD and the random challenge c are sent. |

Figure 6:
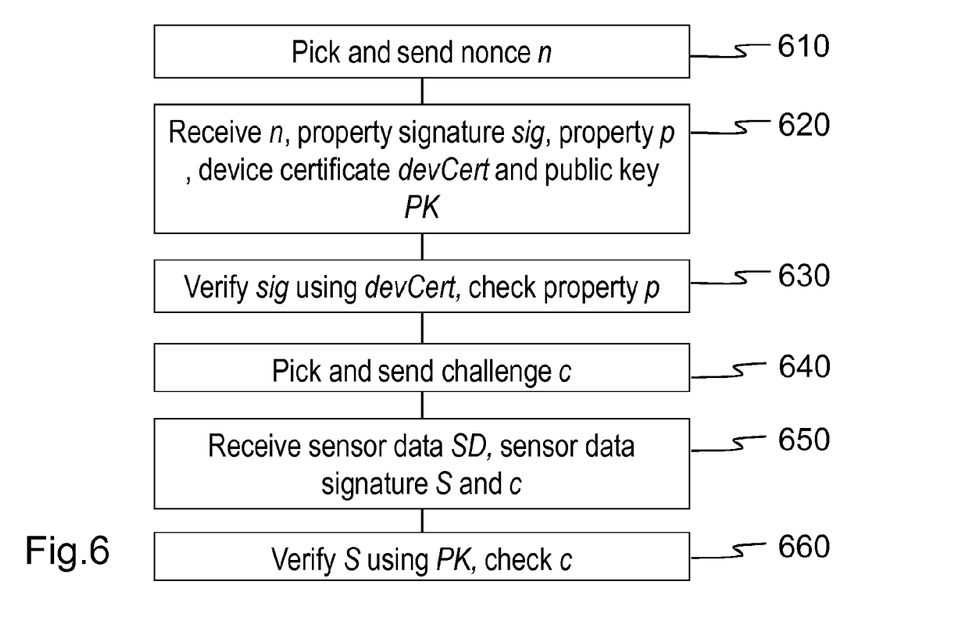
FIG. 6 shows a flow diagram of a method according to an example embodiment in an online service.

FIG. 6 shows a flow diagram of the method in the online service 200 according to an example embodiment. The steps of the method are carried out as described hereinbefore with reference to FIG. 3.

| | |
|---|---|
| 610 | A random nonce n is picked and sent. |
| 620 | A property signature sig, the random nonce n, a property p, a public key PK and a device specific certificate devCert are received. |
| 630 | The property signature sig is verified and property p checked. |
| 640 | A random challenge c is picked at random and sent. |
| 650 | A sensor data signature S, sensor data SD and the second random challenge c are received. |
| 660 | The sensor data signature S is verified and the second random challenge c is checked. |

Figure 7:
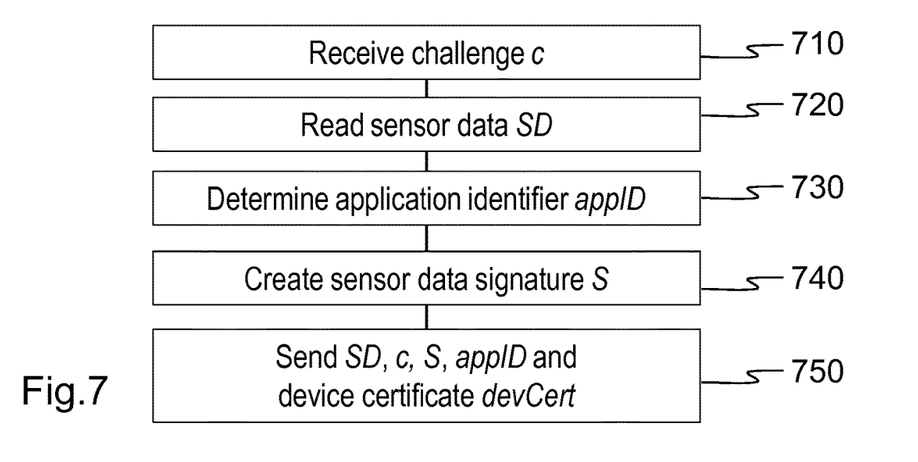
FIG. 7 shows a flow diagram of a method according to an example embodiment in a mobile device.

FIG. 7 shows a flow diagram of the method in the apparatus 100, or mobile device, according to a further example embodiment. The steps of the method are carried out as described hereinbefore with reference to FIG. 4.

| | |
|---|---|
| 710 | The application 104 receives a random challenge c. |
| 720 | The application 104 reads sensor data SD to be attested. |
| 730 | The attestation component 108 determines the application identity appID. |
| 740 | The trusted zone (TEE) 110 creates a sensor data signature S. |
| 750 | The signature S, the random challenge c, the application identifier appID, the sensor data SD and the device specific certificate devCert are sent. |

Figure 8:
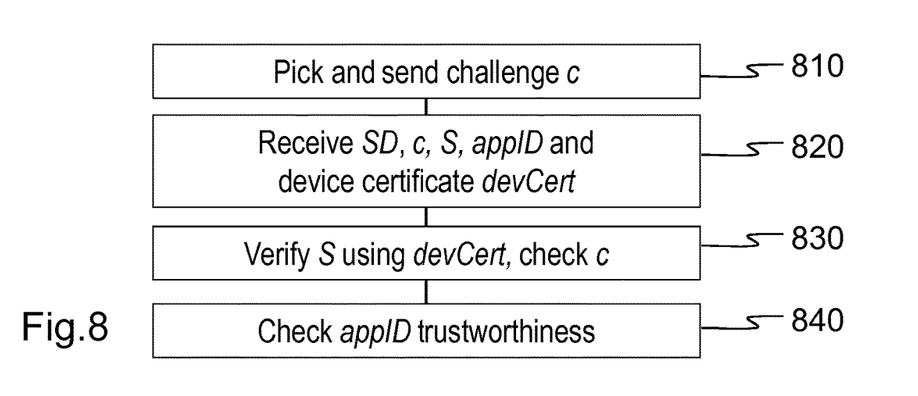
FIG. 8 shows a flow diagram of the method according to an example embodiment in an online service.

FIG. 8 shows a flow diagram of the method in the online service 200 according to a further example embodiment. The steps of the method are carried out as described hereinbefore with reference to FIG. 4.

| | |
|---|---|
| 810 | A random challenge c is picked and sent. |
| 820 | A sensor data signature S, the random challenge c, an application identifier appID 118, sensor data SD and a device specific certificate devCert are received. |
| 830 | The signature S is verified and the random challenge c is checked. |
| 840 | The trustworthiness of the application identifier appID 118 is checked. |

Some examples of different use cases of some example embodiments of the attested sensor data reporting are as follows. In a first use case, referring to FIG. 1, a partner firm or company, for example a restaurant, of an online service 200a, is marketing its services by providing financial gain to customers visiting the restaurant for example for the first time or recurrently. In order to receive the financial gain, the customers are required to provide sensor data with their mobile device 100a of their visit to the restaurant to the mobile service 200, i.e. to "check in" at the restaurant. In order to ascertain that no financial gain is retrieved by providing false location data, the attestation of sensor data according to an example embodiment is applied.

In a second use case, again referring to FIG. 1, the online service 200b is a real-time traffic information system utilizing sensor data from mobile devices 100 in transit for providing accurate traffic information. Here, it is in the interest of both the users of the mobile devices with a client application for the real-time traffic information system and the service provider that the sensor data, e.g. location, speed and weather related data is current and reflects the actual situation of the mobile device 100 and the user thereof. Attesting the sensor data according to example embodiment provides for more accurate information and thus for smoother traffic.

In a third use case, again referring to FIG. 1, the online service 200c provides media content for download for users of mobile devices 100c. In some cases a part of the content is available only in some locations, for example due to copyright reasons, or content with location-specific advertisement is meant to be provided. Again, attesting the sensor data, i.e. the location of the mobile device 100c according to example embodiment provides for an improved user experience and helps the service provider to avoid for example copyright violations.

In a fourth use case, an application programmer and/or provider is introducing a new application 104 providing sensor data, e.g. location data, to an online service 200. Instead of having to negotiate with manufacturers of different apparatuses, or mobile devices, 100 to update the attestation components 108 of the apparatuses in order to provide attested sensor data, the manufacturer of the applicant only needs to receive an application identifier appID 118 from a trusted application certifying infrastructure, such as an application store of the provider of the online service 200.

In a fifth use case an online service 200 is a map service and seeks to provide users of the apparatus, or mobile device, 100 information, hints or advertisement, on points of interest such as for example restaurants, retail outlets or service stations in their vicinity. Accordingly, it is in the interest of both the user of a mobile device 100 and the service provider of the online service 200 that the sensor data, e.g. location or weather condition, is attested to be current and correct in order to provide accurate information. Furthermore, as the sensor data is attested according to an example embodiment, the possibility of e.g. malicious or disturbing third party advertisements is avoided.

Without in any way limiting the scope, interpretation, or application of the appended claims, a technical effect of one or more of the example embodiments disclosed herein is providing sensor data attestation with existing infrastructure, i.e. without changes needed to network infrastructure or the devices used in a network. Another technical effect of one or more of the example embodiments disclosed herein is hindering malicious use of sensor data for financial or other purpose. Another technical effect of one or more of the example embodiments disclosed herein is the ability to easily provide applications, the sensor data used by which can be trusted. Another technical effect of one or more of the example embodiments disclosed herein is to provide an attestation mechanism safer from malicious attacks.

It will be understood that each operation of the flowchart, and/or combinations of operations in the flowchart can be implemented by various means. Means for implementing the operations of the flowchart, combinations of the operations in the flowchart, or other functionality of the example embodiments described herein may comprise software, hardware, application logic or a combination of software, hardware and application logic. The application logic, software or an instruction set is maintained on any one of various conventional computer-readable media. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the afore-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A mobile device comprising:
   a memory tangibly storing executable instructions;
   a sensor; and
   a first processor configured with the memory and executable instructions to cause the mobile device to:
   in response to receiving a first challenge from an online service, verify an identity of an application using an application identifier generated by a trusted zone of the first processor and after verifying the identity send to the online service a property signature (sig) created with at least the first challenge, a public key (PK) of the application and a device certificate (devCert) issued by a trusted authority, and after sending the sig, PK and devCert;
   receive a second challenge from the online service;
   read sensor data associated with the application from the sensor, wherein the sensor data comprises data associated with the location or position of the mobile device;
   create a sensor data signature (S) by the trusted zone of the first processor based on the sensor data; and
   send the sensor data signature, the second challenge and the sensor data to the online service for enabling the online service to attest the validity of the sensor data by verifying the second challenge and the sensor data signature using the public key of the application.

2. The mobile device according to claim 1, wherein
   the identity of the application is verified using a parameter (p) selected by the application and the application identifier of the application.

3. The mobile device according to claim 2, wherein the first processor is configured with the memory and executable instructions to cause an attestation component to determine the application identifier of the application.

4. The mobile device according to claim 1, wherein the first processor is configured with the memory and executable instructions to cause the trusted zone to create the sensor data signature from the second challenge, the sensor data and the application identifier of the application.

5. The mobile device according to claim 1, wherein the first challenge is a nonce;
   a property (p) of the application is used to verify the identity of the application;
   and the property signature (sig) is created with at least the nonce, the public key (PK), the device certificate (devCert), and the property (p).

6. The mobile device according to claim 5, wherein the first processor is configured with the memory and executable instructions to cause the application to select the property.

7. The mobile device according to claim 5, wherein the first processor is configured with the memory and executable instructions to cause an attestation component to verify the identity of the application.

8. The mobile device according to claim 5, wherein the first processor is configured with the memory and executable instructions to cause the trusted zone to create the property signature.

9. A method for operating a mobile device comprising a sensor and a first processor, the method comprising:
   in response to receiving a first challenge from an online service, verifying an identity of an application using an application identifier generated by a trusted zone of the first processor and after verifying the identity sending to the online service a property signature (sig) created with at least the first challenge, a public key (PK) of the application and a device certificate (devCert) issued by a trusted authority, and after sending the sig, PK and devCert:
   receiving a second challenge from the online service;
   reading sensor data associated with the application from the sensor, wherein the sensor data comprises data associated with the location or position of the mobile device;

creating a sensor data signature (S) based on the sensor data by the trusted zone of the first processor; and sending the sensor data signature, the second challenge and the sensor data to the online service for enabling the online service to attest the validity of the sensor data by verifying the second challenge and the sensor data signature using the public key of the application.

10. The method according to claim 9, wherein verifying the identity of the application comprises using a parameter (p) and the application identifier of the application.

11. The method according to claim 9, wherein an attestation component of the mobile device determines the application identifier of the application.

12. The method according to claim 9, wherein the trusted zone creates the sensor data signature from the second challenge, the sensor data and the application identifier of the application.

13. The method according to claim 9 wherein:

the first challenge is a nonce;

a property (p) of the application is used for verifying the identity of the application;

and the property signature sig is created with at least the nonce, the property, the device certificate and the public key.

* * * * *